(12) United States Patent
Belk

(10) Patent No.: US 6,898,203 B2
(45) Date of Patent: *May 24, 2005

(54) DYNAMIC DELAY COMPENSATION FOR PACKET-BASED VOICE NETWORK

(75) Inventor: R. Randall Belk, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 530 days.

This patent is subject to a terminal disclaimer.

(21) Appl. No.: 10/026,004

(22) Filed: Dec. 21, 2001

(65) Prior Publication Data

US 2002/0064171 A1 May 30, 2002

Related U.S. Application Data

(63) Continuation of application No. 09/168,807, filed on Oct. 8, 1998, now Pat. No. 6,370,125.

(51) Int. Cl.[7] .............................................. H04L 12/56
(52) U.S. Cl. ..................................... 370/412; 370/428
(58) Field of Search ............................... 370/330–335, 370/351, 352, 428, 442, 413–419, 503, 384, 216, 229, 508, 519, 465, 466, 441, 347, 321, 468

(56) References Cited

U.S. PATENT DOCUMENTS

| | | | |
|---|---|---|---|
| 4,453,247 A | 6/1984 | Suzuki et al. ................. | 370/94 |
| 4,538,259 A | 8/1985 | Moore .......................... | 370/60 |
| 4,726,019 A | 2/1988 | Adelmann et al. ............ | 370/94 |
| 5,615,214 A | 3/1997 | Chandos et al. ............. | 370/349 |
| 5,659,541 A | 8/1997 | Chan ........................... | 370/236 |
| 6,064,676 A | 5/2000 | Slattest et al. ............... | 370/412 |
| 6,101,195 A | 8/2000 | Lyons et al. ................. | 370/498 |
| 6,370,125 B1 * | 4/2002 | Belk ............................ | 370/312 |

OTHER PUBLICATIONS

U.S. Appl. No. 09/442,299, entitled: Active Decoupling and Power Management Circuit for Line–Powered Ringing Generator.

U.S. Appl. No. 09/378,382, entitled: Power– Limited Remote Termination Converter With Wetting Current and Emergency Power Operation for Digital Data Services Equipment.

* cited by examiner

Primary Examiner—Dang T Ton
(74) Attorney, Agent, or Firm—Allen, Dyer, Doppelt, Milbrath & Gilchrist, P.A.

(57) ABSTRACT

A buffer delay control mechanism controls the operation of a packet buffer of a digitized packet-based transmission network. The packet buffer receives packets from the network and controllably reads out packets for application to a digitized packet signal processor. A nominal buffer delay is maintained in the absence of an increase in delay in receipt of packets from the network. In response to an increase in network delay, the buffer delay is increased, and thereafter maintained at the increased value in the absence of a further increase in delay in receipt of packets from the network. For any further increase in throughput delay, the buffer delay is again updated, so as to maintain the value of buffer delay at a value associated with maximum encountered transport delay through the network.

16 Claims, 2 Drawing Sheets

DYNAMIC DELAY COMPENSATION FOR PACKET-BASED VOICE NETWORK

CROSS REFERENCE TO RELATED APPLICATION

This application is a continuation of U.S. patent application Ser. No. 09/168,807 filed Oct. 8, 1998 now U.S. Pat. No. 6,370,125.

FIELD OF THE INVENTION

The present invention relates in general to digital communication networks, and is particularly directed to a new and improved mechanism for compensating for variable transport delay encountered in a packet-based digital voice network, by dynamically updating, as necessary, the value of buffer delay injected at a receive decoder end of the network, so as to maintain the buffer delay at a value associated with the maximum value of transport delay that has been encountered in the course of a call.

BACKGROUND OF THE INVENTION

Digital voice networks are generally comprised of two principal building blocks—an encoder and a decoder—that are customarily implemented in a single piece of encode/decode hardware known as a CODEC. As diagrammatically shown in FIG. 1, respective CODECs 1 and 2 are installed at opposite ends of a communication channel 3, that provides digital transport capability between equipments at respective 'west' and 'east' sites 4 and 5 of the network. The respective encoder portions 1E and 2E of CODECs 1 and 2 sample analog voice signals supplied thereto at a prescribed sampling frequency and convert the samples into a digital representation suitable for transport over the channel 3. The sampling rate of an analog voice signal in conjunction with the amount of data per sample determines the required bandwidth for the channel.

In a typical network, each voice channel is assigned to a dedicated time-slot of a time division multiplexed (TDM) network. Because each voice channel has a dedicated time slot, data arrives at the decoder portion of the CODEC in a very constant and predictable manner. This is diagrammatically illustrated in the timing diagram 20 of FIG. 2, where successive TDM data packets 21–25 are shown as being equally spaced apart by respective spacings α in successive ones of an arbitrary sequence of packet intervals 11–15 within a voice channel of interest, so as to enable the CODEC to convert the data back into an analog voice signal.

A shortcoming of such a TDM voice network is that when no voice call is being made, the dedicated bandwidth for that voice channel is wasted. To overcome this wasted bandwidth problem, statistically based packet switching networks have been developed, in which bandwidth is statistically multiplexed on an as-needed basis. In such a packet switched network, the available bandwidth may be considered to be a single large "pipe" into which packets of data are inserted.

As shown diagrammatically in FIG. 3, digitized data (voice or otherwise) to be transported is segmented into small segments or packets 40, which are placed into a queue 42 and then transmitted, in the order in which they are placed into the queue, by a transceiver 44 over the digital communication channel 46 to a CODEC 50 at the far end of the channel. Each packet of data occupies the entire bandwidth for a small period of time.

Now although packet-based networks overcome the wasted bandwidth problem, they also introduce a variable amount of delay into the network. Namely, because packets do not have a dedicated time-slot, their arrival at the receive or far end of the network will depend upon on how much data has been queued up in front of them. While this variable delay may not be of particular concern for data-only applications, it can become quite noticeable in voice applications. This problem is illustrated diagrammatically in the above-referenced timing signal diagram 30 of FIG. 2, which shows the example of a first voice packet 31 arriving on time in packet interval 11, while the next two voice packets 32 and 33 are delayed by a relatively large interval β, and do not arrive until interval 14 during which data packet 34 is expected.

As pointed out above, the decoder portion of the CODEC 50 requires that data be supplied at a constant interval. Since there is no data present at any time during the packet intervals 12 and 13, and it is further delayed in interval 14, the decoder cannot reliably reproduce the original audio during this period. This condition may or may not be detectable by the human ear, depending on the length of the delay and the mechanism employed by the decoder to handle the idle time between packets. This problem is compounded by the fact that the late packets can be expected to eventually arrive, at which time the decoder has to decide what to do with them (since their time slots (intervals 12 and 13) have already passed). If this sequence of events occurs often enough, it can degrade voice performance to the point that the CODEC is not useable.

One way to counter this problem, diagrammatically shown in FIG. 4, is to delay the packets (under the control of an attendant microcontroller, shown at 55) through a buffer 60, such as a first-in, first-out data register (or FIFO), that is inserted into the receive or decoder end of the transport path through the CODEC 50. The challenge is to determine the proper amount of buffering (delay), that will allow the listener to comfortably discern the voice signals that the received packets represent. One approach is to establish a fixed delay at the beginning of a call, by buffering a given number of packets that are estimated to compensate for a reasonable amount of transport variance in the network. While this approach can work reasonably well, it has the shortcoming that a fixed delay buffer delay does not take into account actual network conditions. The amount of buffering needed to ensure proper operation at worst-case may be large enough to be discernible by and unacceptable to some individuals.

SUMMARY OF THE INVENTION

The present invention solves the foregoing problem by automatically dynamically adjusting (increasing) the size of (or delay through) the buffer, based upon actual network conditions as they are encountered during a call. As will be described, the present invention operates on the premise that, if one or more packets are delayed in the network, their eventual arrival can be expected to be at a rate that is too fast to be processed in real-time by the decoder. Such eventual arrival may be exhibited as a string of immediately successive voice packets arriving a relatively large interval after arrival of a previous packet in its expected packet interval.

As will be described the delay adjustment mechanism of the invention handles this problem in two parts. The first answers the question of what to do (namely what to provide over the decoder—listener path) during the delay period (when no packets are being received). Where the delay is reasonably brief and the amount of information in each packet is small, the last received packet is replayed in place of the missing packets. However, if delays are long, replaying the same packet over and over can begin sounding very unnatural. In this case, after the expiration of a user-programmed amount of time, the decoder may stop replaying the packet and begin playing silence.

The second question is what to do with the late-arriving packets. In accordance with the present invention, late arriving packets are written into the delay buffer in the order that they arrive. They are then played out from the buffer at the nominal decoder data processing rate. Once some number of packets have been buffered in this manner, any further delay of the same duration or shorter than that currently provided by the buffer will not be heard by the user, since previously stored packets will be read out of the buffer in a periodic manner (and thereby played out to the listener) during the delay interval.

However, should a longer network transport delay be encountered, an outage may be noticed, but only for the period of time exceeding the original outage. As a consequence, in the absence of an increase in network transport delay in excess of the delay interval, the decoder will remain some number of packets behind (missing or not received during the delay interval) for the duration of the call, introducing an overall end-to-end delay into the system. Should another delay of this same duration or less occur, the decoder will not be affected, as it will have a constant supply of packets from the input buffer.

The amount of delay through the buffer will thereby be effectively equal to the largest delay encountered up to that point. In other words, delay is only inserted as it is required. It should be noted that once delay is encountered during a call, it is likely that another delay will follow. For this reason, any delay added by the buffering of packets is maintained for the duration of the call. Attempting to reduce the buffer size in real time would only cause more delays to be noticed by the user.

DETAILED DESCRIPTION

Figure 1:
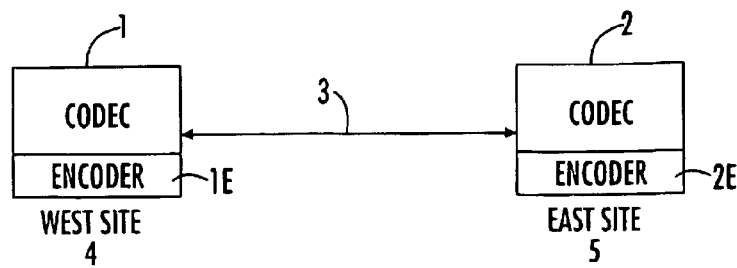
FIG. 1 diagrammatically illustrates respective CODECs installed at opposite ends of a digital transport channel of a digital voice network.

Before describing in detail the dynamically adjusted transport delay compensation mechanism of the present invention, it should be observed that the invention resides primarily in what is effectively a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow chart of the buffer delay control program to be described are primarily intended to show the major components of the system in a convenient functional grouping and processing sequence, whereby the present invention may be more readily understood.

As noted briefly above, the buffer delay control mechanism of the present invention is installed in and executed by the CODEC's microcontroller, and is operative to automatically and dynamically adjust the size of (namely packet delay through) the CODEC's decoder-associated transport delay buffer, based upon actual network conditions encountered during the course of a call. Again, with reference to the timing signal diagram 30 of FIG. 2, a successive string of delayed packets 32–35 arrive a delay interval $\beta$ after initial packet 31, which is too fast to be processed in real-time by the CODEC.

The buffer delay control mechanism of the invention not only controls the buffering of the late-arriving packets in the delay buffer, but also determines what is to be supplied to the decoder—listener path during the delay period between packets. Where the delay interval $\beta$ is reasonably brief and the amount of information in each packet is small, the last received packet may be replayed in place of the missing packets. In the example shown in FIG. 2, during the delay interval $\beta$ of the (empty) voice packet intervals 12 and 13, the decoder portion of the CODEC may replay the same voice packet (voice packet 31). However, if the delay is relatively long, replaying the same packet plural times may sound unnatural. In such a case, after the expiration of a user-programmed amount of time, the decoder is instructed to stop replaying the packet and begin playing silence.

The late-arriving or delayed packets are written into the delay buffer in the order that they arrive, and are thereafter read out of the buffer at the nominal decoder data processing rate. Once a prescribed number of packets have been buffered in this manner, any further delay in arrival of new packets that is the same as or shorter than the delay currently provided by the buffer will not be detected by the listener, since previously buffered packets will be successively read out of the buffer and played to the listener during the delay interval. Although an increase in network transport delay may produce a noticeable outage, it will exist only for the period of time exceeding the original delay.

Figure 2:
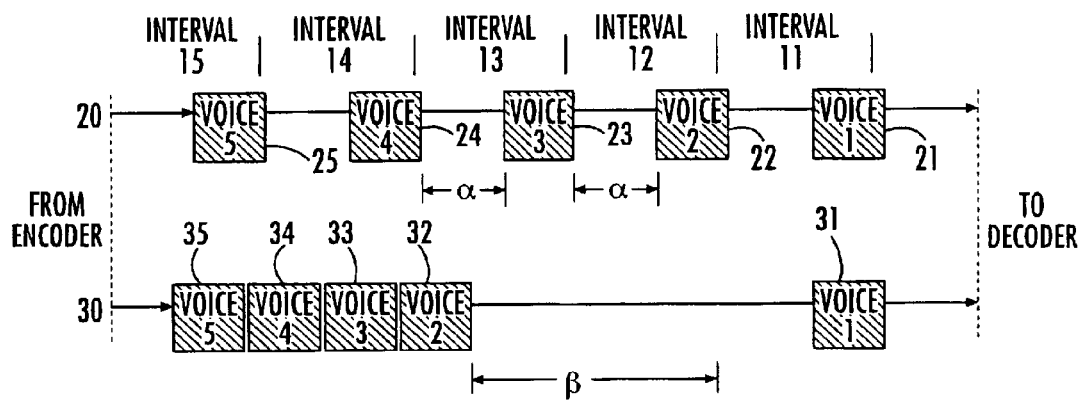
FIG. 2 is a set of timing diagrams for illustrating transport delay encountered in a voice packet network.
Figure 3:
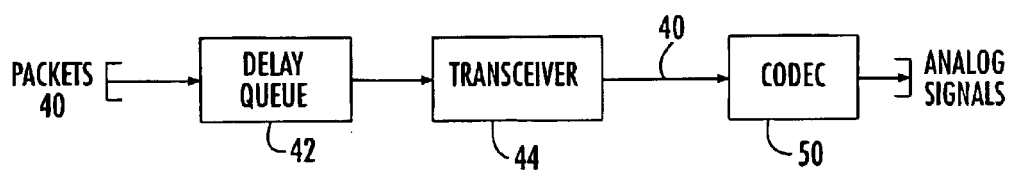
FIG. 3 diagrammatically illustrates data packets that are placed into a queue prior to be being transmitted over a digital communication channel.

For the example shown in the timing diagram 30 of FIG. 2, after the delay $\beta$, which terminates during packet interval 13, the first late arriving packet 32 will be routed to and stored in the delay buffer. During the next packet interval 14, this packet (packet 32) will be read out of the buffer and played out by the CODEC (decoder). The next two packets 33 and 34 also arrive during the fourth interval 14. Since one packet (i.e. packet 32) has already been read out during packet interval 14, no additional packet will be played until the next interval 15. As a consequence, packets 33 and 34 will be routed to and stored in the delay buffer. During packet interval 15, the next packet in the received and buffered sequence (here packet 33) is retrieved from the buffer and played by the decoder. In addition, the currently arriving packet (packet 35) is routed into the buffer.

Absent an increase in network transport delay in excess of $\beta$, the CODEC's decoder will remain two packets behind for the duration of the call, introducing an overall end-to-end delay of B into the system. For the example shown in FIG. 2, should another delay of two packets or less occurs, the amount of input delay to the decoder will not be affected, as it will have a constant supply of packets from the buffer. In addition, the amount of delay imparted by the buffer will be equal to the largest delay encountered up to that point. Thus, delay is only inserted as required. Once delay is encountered during a call, it is likely that another delay will follow. For this reason, any delay added by the buffering of packets is maintained for the duration of the call. Attempting to reduce the size of the buffer in real time would only cause more delays to be noticed by the user.

Figure 4:
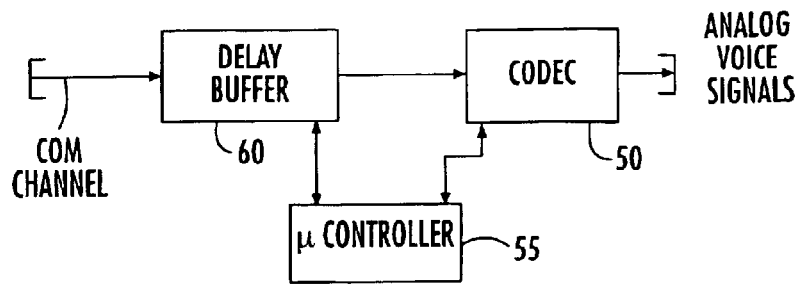
FIG. 4 diagrammatically illustrates the use of a buffer at the decoder end of a digital transport path to compensate for transport delay through the network.
Figure 5:
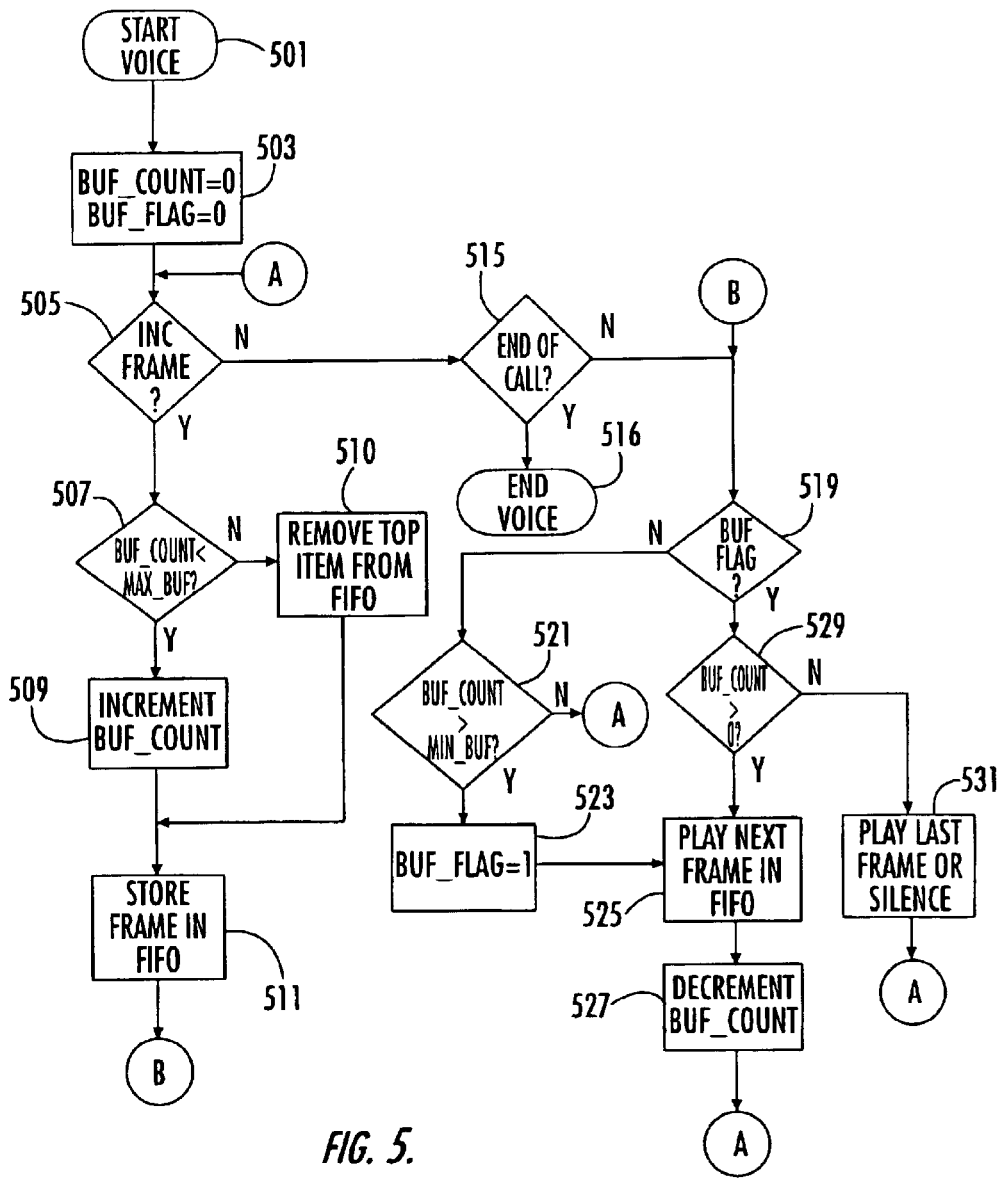
FIG. 5 is a flow chart showing respective steps of the dynamically adjusted transport delay compensation mechanism of the present invention.

Attention is now directed to the flow chart of FIG. 5, which shows the respective steps of the buffer delay control mechanism of the present invention that is executed by the transceiver microcontroller at the receive end of the channel to which the delay buffer and CODEC are coupled, as described above with reference to FIG. 4. The buffer delay control mechanism shown in FIG. 5 employs two user-programmable parameters: 1-MIN_BUF and 2-MAX_BUF. The parameter MIN_BUF is defined to be the number of frames/packets that must be present in the buffer before the decoder portion of the CODEC actually begins playing out frames/packets. This parameter is usually set to a small value (typically a value of '1'), in order to compensate for small amounts of variance in frame/packet arrival time.

The parameter MAX_BUF is the maximum number of frames/packets that can be buffered before frames/packets are discarded. This parameter serves to prevent extremely long delays from being inserted into the data path. The buffer delay control mechanism of the invention also employs a frame/packet softcounter, termed 'BUF_COUNT', which indicates how many frames are currently stored in the delay buffer FIFO. Another parameter, termed 'BUF_FLAG' is used to determine when a minimum number of frames has been received to start playback.

Referring to FIG. 5, in response to a newly incoming voice call at START VOICE step 501, the BUF_COUNT and BUF_FLAG parameters are both cleared or reset to zero in step 503. Next, in query step 505, the routine determines whether an incoming voice packet is detected within the packet interval of interest (such as in a respective reception period of one of the packet intervals 11–15 of FIG. 2. If a voice packet is not detected within the expected packet interval reception period of the packet interval of interest, the answer to step 505 is NO, and the routine transitions to query step 515 to determine whether the failure to detect a packet is due to the fact that the call has terminated. At the beginning of a call, any such failure is ostensibly (although not necessarily) associated with or due to channel transport delay, rather than termination of a call.

If a packet is detected within the packet interval, the answer to step 505 is YES, the routine transitions to query step 507 to determine whether the buffer count value BUF_COUNT is less than the capacity of the delay buffer, namely the parameter MAX_BUF. Since, at the start of a frame, the value of BUF_COUNT has been reset to zero, the answer to step 507 is YES, and the routine transitions to step 509. In step 509, the routine increments the buffer counter BUF_COUNT by '1' (currently from its initially cleared value of '0' to a value of '1'), and transitions to step 511. If the answer to step 507 is NO, the routine transitions to step 510, which discards the oldest data packet from the delay buffer, to make room for the next incoming packet, and then transitions to step 511. As there are currently no packets stored in the buffer, the answer to step 507 is YES, as noted above.

In step 511, the (most recently) received packet/frame is stored in the delay buffer, and the routine transitions to query step 519, which determines whether the buffer flag parameter BUF_FLAG is set to a '1'. Since, at the beginning of the call, this parameter was reset to zero in step 503, the answer to step 519 is NO, so that the routine transitions to query step 521. In query step 521, a determination is made as to whether the count value of the buffer counter BUF_COUNT (which was incremented in step 509 to a value of '1' from its originally cleared value of zero) exceeds the user set parameter MIN_BUF. As pointed out above, the parameter MIN_BUF is used to compensate for small amounts of variance in frame/packet arrival time, and corresponds to a small number of frames/packets (usually '1') that must be present in the buffer, before packets are read out of the buffer for application to the decoder. Since the current value ('1') of the buffer counter BUF_COUNT does not exceed MIN_BUF='1', the answer to query step 521 is NO, and the routine loops back to query step 505, and the sequence described above is again executed.

When the next received packet is stored in the delay buffer, the value of the buffer counter BUF_COUNT will have been incremented from '1' to '2' in step 509, so that during the next loop through query step 521, the newly incremented value ('2') of the buffer counter BUF_COUNT will exceed MIN_BUF='1', whereby the answer to query step 521 will be YES, and the routine transitions to step 523, which sets the previously cleared parameter BUS_FLAG to a '1'. The routine then transitions to step 525, which causes the oldest packet/frame stored in the delay buffer to be played out to the decoder.

Next in step 527, the value of the buffer counter BUF_COUNT is decremented by '1'—indicating a decrease in the contents of the delay buffer—and the routine loops back to step 505. Once the value of BUF_FLAG has been set (in step 523) to a '1', the answer to query step 519 is YES, and the routine transitions from step 519 to query step 529, in order to determine whether the value of the value of the buffer counter BUF_COUNT has been decremented down to '0'—indicating that there are no packets currently stored in the delay buffer.

As pointed out above, if a long delay occurs on the network, the delay buffer will become emptied of packets, causing the answer to step 529 to be YES, and the routine transitions from step 529 to step 531. In step 531, the decoder will either replay the last frame/packet or will play silence for the packet interval of interest, and then loop back to step 505. As described above, if the network delay is unusually long, replaying the same packet over and over can begin sounding very unnatural. In this case, step 531 may include a subroutine, which is effective to terminate replaying the same packet after the expiration of a user-programmed amount of time.

Eventually, as the late packets that gave rise to the delay (such as that shown at β in the timing diagram 30 of FIG. 2) start arriving, the routine will sequentially transition from a YES answer to query step 503 through steps 505–511 for each of theses successively received packets, thereby repeatedly incrementing the buffer counter BUF_COUNT in step 509 and storing the packets in step 511. This will store packets in the buffer up to a level that is equal to the number of repeat and silence frames that had been previously played out in step 531, and will effectively set the end-to-end delay through the buffer to the maximum delay thus far encountered during the call. Thus, the routine of FIG. 5 is effective to increase the amount of delay through the buffer, as necessary to accommodate increases in network delay, by the successive incrementing of the buffer counter BUF_COUNT parameter in step 509 and the storage of an associated packet in step 511, as it is required.

As described previously, once delay is encountered during a call, it is likely that another delay will follow. As the amount of delay increases, the number of eventually arriving packets associated with the increased delay will cause steps 505–511 to further increment the buffer counter BUF_COUNT in step 509 and store the increased number of packets in step 511. This will again bring the number of packets stored in the buffer up to a level that is necessary to set the end-to-end delay through the buffer to the maximum delay encountered during the call.

Namely, the total amount of delay through the buffer will always equal the largest delay encountered up to that point in the call, as delay is only inserted as required. Thus, any delay added by the buffering of additional packets in steps 509 and 511 will be maintained for the duration of the call. As pointed out earlier, attempting to reduce the size of the buffer in real time would only cause more delays to be noticed by the user.

Eventually, when the call ends, the lack of incoming frames/packets to query step 505 will be due to a termination of voice signalling traffic, rather than network delay. In this event, the answer to query step 515 (to which the routine transitions from the NO answer to step 505) will be YES, and the routine will branch to call termination step 516, ending the call. When a new call is received, the BUF_COUNT and BUF_FLAG parameters are both cleared to zero in step 503, and the routine is executed for the new call in the manner described above.

As will be appreciated from the foregoing description, the delay buffer control mechanism of the present invention is operative to automatically dynamically adjust (increase) buffer delay, as necessary, based upon actual network conditions as they are encountered in the course of a call. As described above, the inventive buffer delay control mechanism either replays the last received packet or, if the delay is inordinately long, plays silence over the decoder—listener path during a period of network transport delay. Late-arriving packets are written into the delay buffer in the order that they are received, and are played out of the buffer at the nominal decoder data processing rate.

Once some number of packets have been buffered in this manner, any further delay of the same duration or shorter than that currently provided by the buffer will not be heard by the user, since previously stored packets will be read out of the buffer and periodically played to the listener during the delay interval. In the absence of an increase in network transport delay in excess of the delay interval, the decoder will remain some number of packets behind for the duration of the call, introducing an overall end-to-end delay into the system. Should another delay of this same duration or less occur, the decoder will not be affected, as it will have a constant supply of packets from the input buffer. Thus, the amount of delay will be effectively be equal to the largest delay encountered up to that point.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed:

1. A method of controlling packet delay through a packet buffer of a digitized packet-based transmission network, said packet buffer being operative to store packets received from said network and to controllably read out packets therefrom for application to a digitized packet signal processor, said method comprising the steps of:

(a) establishing a nominal value of buffer delay through said packet buffer for packets received from said network; and (b) in response to an increase in delay in receipt of packets from said network, increasing buffer delay from said nominal value to an increased buffer delay and maintaining said increased buffer delay value in the absence of a further increase in delay in receipt of packets from said network, and thereafter iteratively further increasing said buffer delay, as necessary, for any further increase in delay in receipt of packets from said network, so that the value of buffer delay is adjusted as necessary to a delay value sufficient to accommodate the maximum encountered transport delay through said network.

2. The method according to claim 1, wherein step (b) further comprises, in response to increase in delay in receipt of packets from said network exceeding the maximum available delay through said packet buffer, discarding the oldest packet stored in said packet buffer.

3. The method according to claim 1, wherein step (b) further comprises, in response to said packet buffer becoming depleted of packets, selectively supplying no packet or reapplying the most recently received packet in said packet buffer to said digitized packet signal processor.

4. The method according to claim 1, wherein step (a) includes establishing a minimum number of packets that must be present in said buffer before a packet therein is controllably read out for application to said digitized packet signal processor.

5. The method according to claim 4, wherein step (a) further includes, prior to handling a call, presetting a buffer size counter to a prescribed reset value, contents of said buffer size counter being representative of how may packets are stored in said packet buffer, and generating a buffer flag associated with whether a minimum number of frames has been received.

6. The method according to claim 5, wherein step (a) further comprises monitoring a communication channel of said network for receipt of an incoming voice packet within a respective packet interval and, in response to detecting an incoming voice packet, controllably modifying the contents of said buffer size counter, and storing said incoming voice packet in said packet buffer.

7. The method according to claim 6, wherein step (a) further includes changing said buffer flag from its reset value, in response to said buffer containing said number of packets that must be present before a packet is controllably read out therefrom, and controllably reading out a packet from said packet buffer for application to said digitized packet signal processor.

8. The method according to claim 6, wherein step (a) further includes establishing the maximum number of packets that can be stored in said buffer and, in response to an increase in delay in receipt of late arriving packets from said network for application to said buffer being such as to cause the contents of said buffer to exceed said maximum number, discarding the oldest packet stored in said buffer.

9. A method of optimizing throughput delay in the course of storage into and read-out of packets from a packet buffer of a digitized packet-based transmission network, said packet buffer being operative to store packets received from said network and controllably read out packets therefrom for application to a digitized packet signal processor, said method comprising the steps of:

(a) storing said packets into said buffer, as packets are successively received from said network, until a network transmission delay causes an interruption in receipt of packets from said network, so as to realize a network throughput delay corresponding to the number of packets stored in said buffer at the occurrence of said interruption in receipt of packets from said network;

(b) in response to said interruption in receipt of packets from said network in step (a), sequentially reading out packets stored in said buffer for application to said digitized packet signal processor;

(c) in response to receipt of further packets from said network subsequent to said interruption in step (a), interrupting sequentially reading out of packets from said buffer in step (b), and storing said further packets into said buffer as said further packets are successively received from said network, until a network transmission delay causes an interruption in receipt of said further packets from said network, increasing said buffer throughput delay to an increased network transmission delay corresponding to the total number of packets stored in said buffer; and (d) in response to said interruption in receipt of said further packets from said network in step (c), sequentially reading out packets stored in said buffer for application to said digitized packet signal processor.

10. The method according to claim 9, wherein oldest packet stored in said packet buffer is discarded in response to an increase in delay in receipt of packets from said network exceeding the maximum available delay through said packet buffer.

11. The method according to claim 9, wherein step (c) further comprises, in response to said packet buffer becoming depleted of packets, selectively supplying no packet or reapplying the most recently received packet in said packet buffer to said digitized packet signal processor.

12. The method according to claim 9, wherein step (a) includes establishing a minimum number of packets that must be present in said buffer before a packet therein is controllably read out for application to said digitized packet signal processor.

13. The method according to claim 12, wherein step (a) further includes, prior to handling a call, presetting a buffer size counter to a prescribed reset value, contents of said buffer size counter being representative of how may packets are stored in said packet buffer, and generating a buffer flag associated with whether a minimum number of frames has been received.

14. The method according to claim 13, wherein step (a) further comprises monitoring a communication channel of said network for receipt of an incoming voice packet within a respective packet interval and, in response to detecting an incoming voice packet, controllably modifying the contents of said buffer size counter, and storing said incoming voice packet in said packet buffer.

15. The method according to claim 14, wherein step (a) further includes changing said buffer flag from its reset value, in response to said buffer containing said number of packets that must be present before a packet is controllably read out therefrom, and controllably reading out a packet from said packet buffer for application to said digitized packet signal processor.

16. The method according to claim 15, wherein step (a) further includes establishing the maximum number of packets that can be stored in said buffer and, in response to an increase in delay in receipt of late arriving packets from said network for application to said buffer being such as to cause the contents of said buffer to exceed said maximum number, discarding the oldest packet stored in said buffer.

* * * * *